June 28, 1949.  A. M. LANE  2,474,681

FLOW CONTROL CIRCUIT

Filed June 18, 1945  2 Sheets-Sheet 1

INVENTOR.
ALBERT M. LANE
BY
*Ralph L. Tweedale*
ATTORNEY

INVENTOR.
ALBERT M. LANE
BY Ralph L. Tweedale
ATTORNEY

Patented June 28, 1949

2,474,681

UNITED STATES PATENT OFFICE 2,474,681

FLOW CONTROL CIRCUIT

Albert M. Lane, Detroit, Mich., assignor to Vickers Incorporated, Detroit, Mich., a corporation of Michigan Application June 18, 1945, Serial No. 600,003

8 Claims. (Cl. 60—52)

This invention relates to power transmissions, particularly to those of the type comprising two or more fluid pressure energy translating devices, one of which may function as a pump and another as a fluid motor.

This invention is more particularly concerned with a power transmission system of the type containing a fluid motor and incorporating what is commonly known as a flow-regulating valve for controlling the speed of the motor comprising an adjustable throttle and a compensating valve for maintaining a constant flow across the throttle through which fluid is adapted to flow at a regulated rate regardless of load resistance.

Flow-regulating valves have an important use in hydraulic power transmissions for driving machine tools. They serve the purpose of producing a reduced speed rate of the machine tool, and the machine tool may be driven at a constant regulated rate of speed regardless of load resistance.

In the past some difficulty was presented in preventing motor jump when the motor was started after interruption and in particular when a machine tool slide was moved into a feed position from rest or where there was a resumption of a feed movement after interruption during a slide movement. In many cases, if a feed movement was interrupted and the operator of the machine tool did not back the tool away from the work before resuming a cut, the tool was ruined. This is due to the fact that, when flow through the flow-regulating valve is interrupted, the compensating valve is held to the fully open position by a compensating valve spring. When flow is resumed after interruption, a temporary flow of fluid above the normal regulated rate passes through the open compensating valve before it is able to assume normal regulating position. Although this is only a momentary lapse and the compensating valve almost immediately assumes normal regulating position, this temporary flow of fluid above the normal regulated rate causes the motor to jump slightly before a constant regulated movement begins and ruins a cutting tool.

It is an object of the present invention to provide an improved circuit which overcomes this difficulty.

A further object is to provide in a power transmission system, incorporating a flow-regulating valve for controlling the speed of the fluid motor, a valve and automatic control means therefor connected into the transmission in such a manner as to cause the compensating valve to be in a normal regulating position when the motor is started in a controlled speed movement, thereby preventing motor jump.

Further objects and advantages of the present invention will be apparent from the following description, reference being had to the accompanying drawings wherein a preferred form of the present invention is clearly shown.

Figure 1:
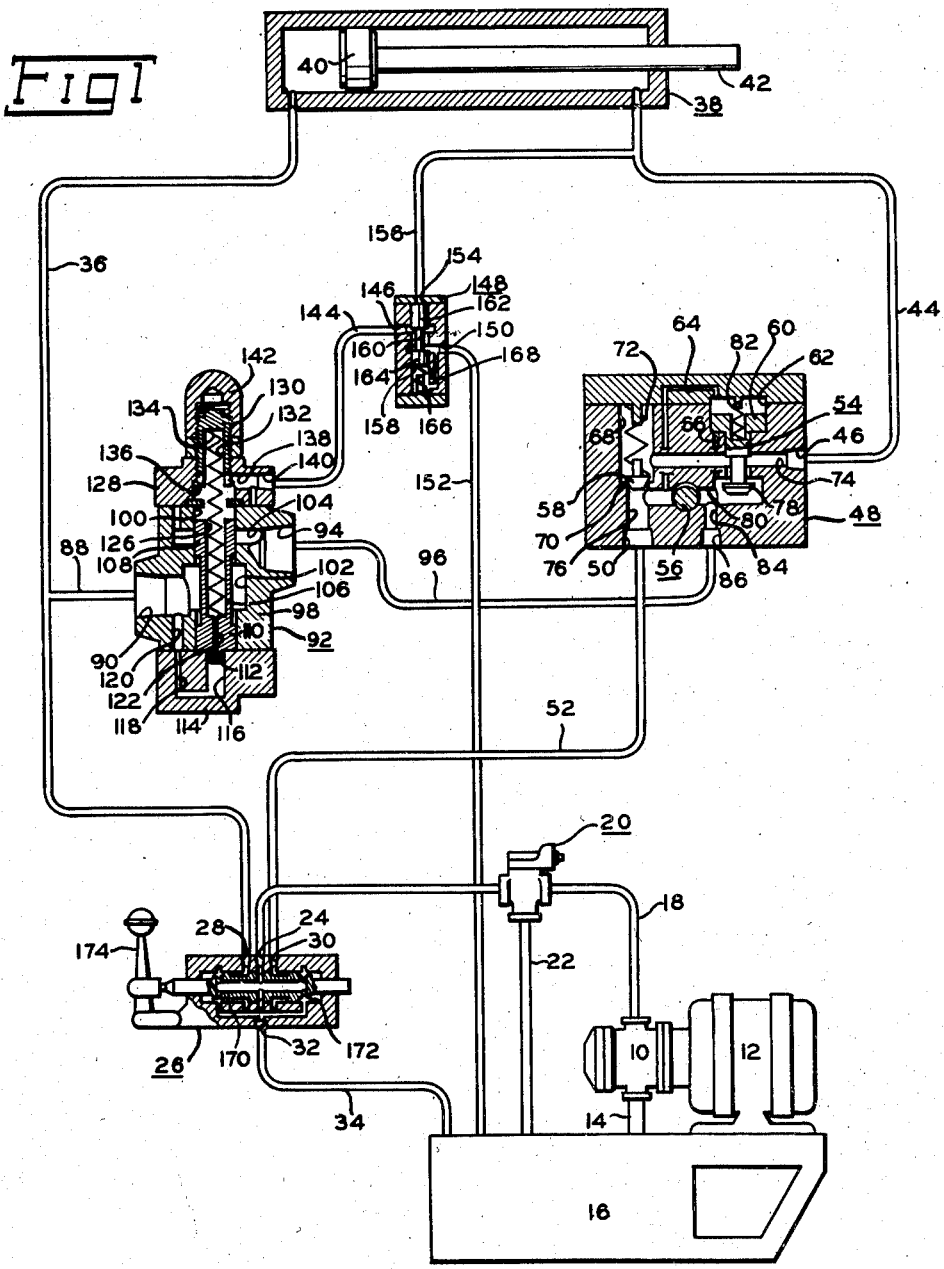
Figure 1 is a diagrammatic view of a power transmission system incorporating a preferred form of the present invention.

Referring now to Figure 1, there is indicated at 10 a pump adapted to be driven by a suitable prime mover, such as an electric motor 12. The pump 10 has a suction conduit 14 for withdrawing fluid from a tank 16 and a delivery conduit 18. Incorporated in pump delivery conduit 18 is a suitable relief valve 20 adapted to pass fluid to tank 16 through an exhaust conduit 22 whenever a predetermined maximum pressure is exceeded in the delivery conduit 18.

Delivery conduit 18 is connected to the pressure port 24 of a suitable four-way directional valve 26 which also has cylinder ports 28 and 30 and a tank port 32. A conduit 34 connects the tank port 32 of directional valve 26 to tank 16. A conduit 36 connects port 28 of valve 26 to the head end of a motor 38 containing a piston 40 to which is connected a piston rod 42. A conduit 44 connects the rod end of motor 38 to an inlet port 46 of a flow-regulating valve 48. An outlet port 50 of valve 48 is connected to cylinder port 30 of directional valve 26 by means of a conduit 52.

Flow-regulating valve 48 contains a compensating valve 54, an adjustable throttle 56 and a check valve 58. A control piston 60 of compensating valve 54 is mounted in a cylinder 62 from which two passages 64 and 66 extend, one from each end to opposite sides of throttle 56. Check valve 68 is mounted in a chamber 68 and held lightly on a seat 70 at one end of chamber 68 by a light spring 72. Chamber 68 is in communication with inlet port 46 by means of an inlet passage 74 and is in communication with an outlet port 50 by means of an outlet passage 76. Compensating valve 54 has an enlarged bevel portion on the lower end thereof forming an inlet valve 78 which controls communication between inlet passage 74 and a passage 80 in which throttle 56 is mounted and which is in communication with outlet passage 76. A spring 82 of predetermined resistance mounted in cylinder 62 and abutting control piston 60 normally biases compensating valve 54 to the fully open position shown when flow through the flow-regulating valve 48 is interrupted.

A passage 84 intersecting passage 80 at a point between throttle 56 and compensating valve 54 forms a means of communication between passage 80 and a third external connection port 86 of valve 48. A branch conduit 88 of conduit 36 is connected to an inlet port 90 of a pressure control valve 92, and an outlet port 94 of valve 92 is connected to port 86 of valve 48 by means of a conduit 96.

Valve 92 is comprised of a body 98 having a centrally-located longitudinal bore 100 extending completely through the body 98 and provided with an enlarged portion 102 in communication with inlet port 90 and an enlarged portion 104 in communication with outlet port 94. Communication between inlet port 90 and outlet port 94 may be opened or closed by a reciprocable valve spool 106 having a pair of piston heads 108 and 110 which are freely slidable in bore 100. Piston head 110 has a projection 112 on its lower end. A lower end cap 114 having a pilot entrance chamber 116 and a passage 118 in communication therewith is bolted to body 98 so that an auxiliary passage 120 of enlarged portion 102 forms a communication with passage 118. A restricted passageway 122 in projecting portion 112 and piston head 110 forms a means of communication between pilot entrance chamber 116 and a bore 126 which extends from restricted passageway 122 completely through the remainder of spool 106.

Bolted to the upper end of body 98 is an end cap 128 within which is threaded an adjusting screw 130 having a recess 132. A spring 134 of predetermined resistance is mounted in bore 126 of spool 106 and recess 132 of screw 130 and extends through a bore 136 of end cap 128. A passage 138 in end cap 128 forms a means of communication between bore 136 and a control port 140. A protective cap 142 is threaded over screw 130.

Control port 140 of valve 92 is connected by a conduit 144 to an inlet port 146 of a pressure responsive control valve 148. An outlet port 150 of valve 148 is connected to tank 16 by means of a conduit 152, and a pressure port 154 is connected to conduit 44 by a branch conduit 156. Valve 148 has a longitudinal bore 158 in communication with the ports mentioned within which is a reciprocable spool 160 having lands 162 and 164 of equal effective area. Spool 160 is normally biased to the open position shown by a spring 166 so that communication is established between inlet port 146 and outlet port 150. When spool 160 is shifted downwardly, land 162 blocks communication between inlet port 146 and outlet port 160, and fluid in bore 158 on the underside of land 164 is permitted to escape by means of a restricted passageway 168 in communication with outlet port 150.

Directional valve 26 is of the open-center type and contains a spool 170 shiftable within a bore 172. Connected to spool 170 is a handle 174 for the purpose of manual operation of the same. Valve 26 is so designed that, when the handle 174 is in the position shown, pump delivery conduit 18 is connected directly to tank conduit 34 with ports 28 and 30 being blocked so that the motor is stopped by reason of the complete pump delivery being delivered directly to tank 16. Shifting of the handle 174 to the left will connect conduit 18 to conduit 52 and conduit 36 to conduit 34 so as to direct pump delivery to the rod end of motor 38. Shifting of the handle 174 to the right will connect conduit 18 to conduit 36 and conduit 52 to conduit 34 so as to direct pump delivery to the head end of motor 38.

Referring now to Figure 1, in operation, with the electric motor 12 running and operating pump 10 and with the handle 174 of directional valve 26 in the position shown, pump 10 is unloaded, and motor 38 is stopped by reason of full pump flow being delivered to tank 16 by conduits 18 and 34. If the handle 174 of valve 26 is shifted to the right to connect conduit 18 to conduit 36 and conduit 52 to conduit 34, fluid pressure will be conducted to the head end of motor 38 by conduits 18 and 36 and also to the inlet port 90 of valve 92 by branch conduit 88. Pressure fluid entering inlet port 90 enters enlarged portion 102, passage 120 and by passage 118 to pilot entrance chamber 116 where it acts against projection 112 and piston head 110 against the resistance offered by spring 134. Piston head 108 blocks flow from inlet port 90 through outlet port 94. Pressure fluid entering chamber 116 may flow through restricted passageway 122 but will be replaced in chamber 116 by pump 10 faster than it may leave chamber 116 by passageway 122.

The total effective area of projection 112 and the bottom of piston head 110 is equal to the total effective area on the upper side of piston head 110 within bore 126 and the area on the upper side of piston head 108. However, due to the fact that fluid in bores 126 and 136 and recess 132 has a free access to tank 16 by means of passageway 138, port 140, conduit 144, ports 146 and 150 of valve 148 and conduit 152, a greater upward thrust is imposed on projection 112 and the bottom of piston head 110, overcoming the resistance of spring 134 and shifting spool 106 upwardly so that piston head 108 opens communication between inlet port 90 and outlet port 94. The pressure necessary to shift spool 106 is slight and is much less than the pressure needed to overcome the load resistance imposed upon motor 38 so that piston 40 of motor 38 remains stationary.

Figure 2:
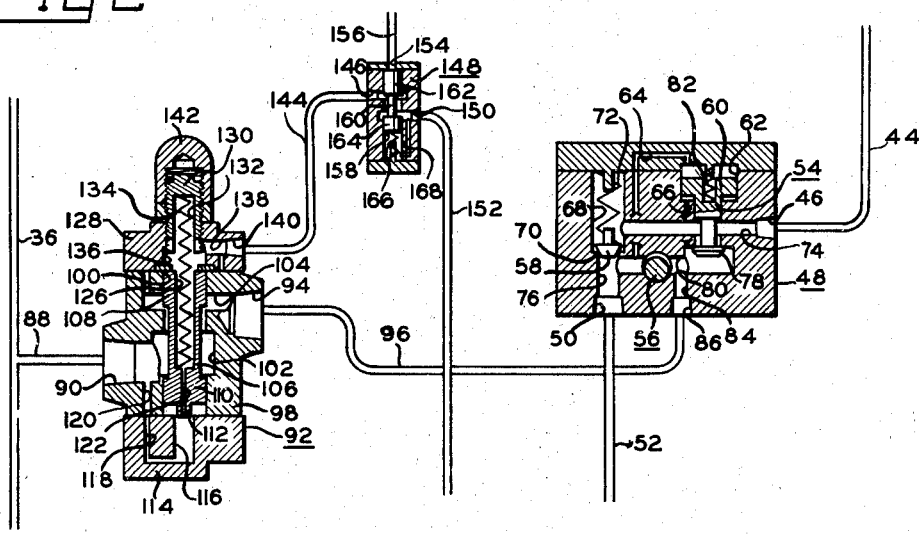
Figure 2 is a diagrammatic view of a portion of the same hydraulic power transmission system shown in Figure 1 but showing the parts in another position during operation.

Referring now to Figure 2, when spool 106 shifts to open communication between inlet port 90 and outlet port 94, pressure fluid from pump 10 is now free to flow through valve 92 to port 86 of flow-regulating valve 48 by means of conduit 96. Pressure fluid entering port 86 enters passage 84 and into passage 80 where it acts against the bottom of inlet valve 78 and also may enter passage 66 where it acts against the bottom of control piston 60, overcoming the slight resistance of spring 82 and shifting compensating valve 54 to the closed position. Fluid in cylinder 62 on the upper side of piston 60 may escape to tank 16 through passages 64, 80 and 76, port 50, and conduits 52 and 34. Although some fluid may escape past inlet valve 78 into inlet passage 74 and by means of port 46 into conduits 44 and 156, this has no harmful effect and aids in completely filling said conduits with fluid in case they have become slightly depleted.

Fluid from pump 10 entering passage 80 also flows through throttle 56, passage 76, port 50, and by means of conduits 52 and 32 to tank 16. Due to the fact that throttle 56 has been originally adjusted to pass less than full pump delivery and offers a resistance to fluid flow, a pressure increase takes place almost immediately sufficient to overcome the load resistance on motor 38, and pressure fluid in conduit 36 begins to shift piston 40 of motor 38. Due to the fact that compensating valve 54 is in the closed position, fluid may not flow from conduit 44 to conduit 52. However, discharging fluid from the rod end of motor 38 may enter conduit 156 and enter port 154 of valve 148 where it acts on land 162 of spool 160 against the resistance offered by spring 166 and overcoming the same.

Figure 3:
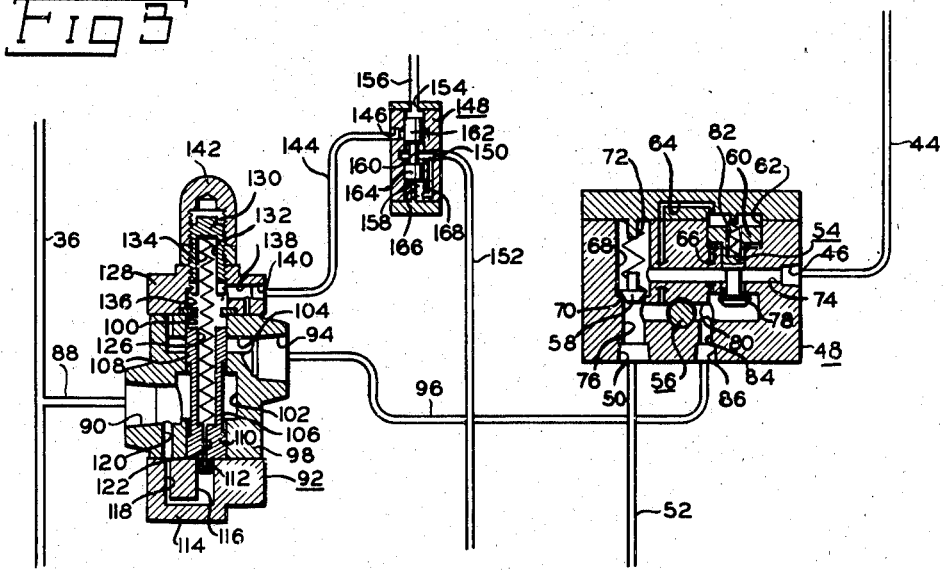
Figure 3 is a diagrammatic view of the portion of the same hydraulic power transmission system shown in Figure 1 but showing the parts in still another position during operation.

Referring now to Figure 3, as the spool 160 shifts downwardly, fluid in bore 158 on the underside of land 164 must leave by restricted passageway 168 and will flow to tank 16 by means of port 150 and conduit 152. The necessity of fluid leaving bore 158 by means of restricted passage 168 provides a dashpot action which will prevent piston 40 of motor 38 from jumping at this stage of the operation. Only a slight amount of fluid displacement from motor 38 is necessary to shift spool 160 sufficiently so that land 162 will block communication between inlet port 146 and outlet port 150 of valve 148.

When fluid flow through passageway 122 and bores 100, 126 and 136 of valve 92 to tank 16 is interrupted by the closing of valve 148, the pressures in pilot entrance chamber 116 and within bores 100 and 126 equalize. Due to the fact that the effective areas of projection 112 and the underside of piston head 110 are equal to the total effective areas of piston head 110 within bore 126 and the upper side of piston head 108 within bore 100, the upward and downward pressure thrusts are equal, and spring 134 will shift spool 106 downwardly so as to cause piston head 108 to block communication between inlet port 90 and outlet port 94.

When fluid flow from pump 10 through valve 92 to port 86 of valve 48 is interrupted, compensating valve 54 is free to gradually open and to regulate the speed of motor 38 in the well-known manner. The purpose of compensating valve 54 is to maintain a constant pressure drop across the throttle 56. Compensating valve 54 is responsive to the pressure drop across throttle 56, the pressure ahead of throttle 56 being responsive on the underside of control piston 60 by means of passage 66, and the pressure beyond throttle 56 being responsive on the upper side of piston 60 by means of passage 64. Any increase or decrease of pressure in passage 80 is also reflected in passage 66, causing compensating valve 54 to shift more fully to the closed position to admit less fluid into passage 80 or to shift more fully to the open position to admit more fluid into passage 80 and thus maintain constant the flow across throttle 56. Any back pressure in conduit 52 is also reflected in passage 80 and by means of passages 64 and 66 is responsive on control piston 60 in order to make compensating valve 54 truly responsive to the pressure drop across throttle 56. Discharging fluid from the rod end of motor 38 must pass through compensating valve 54 and throttle 56 because fluid entering inlet passage 74 is prevented by check valve 58 from having a free outlet to tank 16.

Upon the completion of movement of piston 40 of motor 38, if the directional movement of piston 40 is to be reversed, the handle 174 of valve 26 is shifted to the left in order to connect conduit 18 to conduit 52 and conduit 36 to conduit 34. Pressure fluid from pump 10 is now delivered by conduit 18 to valve 26 and by means of conduit 52 to the outlet port 50 of valve 48 from where it has a free outlet to the rod end of motor 38 by means of passage 70, check valve 58, passage 74, port 46 and conduit 44. Check valve 58 permits free flow of fluid from passage 76 to passage 74. Discharging fluid from the head end of motor 38 has a free outlet to tank 16 by means of conduit 36, valve 26 and conduit 34. Thus, the speed of piston 40 is controlled when shifting to the right, but, when shifted to the left, is permitted to move at a much faster speed because fluid delivery from pump 10 is bypassed by check valve 58 around compensating valve 54 and throttle 56 directly to the rod end of motor 38.

If motor 38 is stopped during a movement of piston 40 to the right by shifting handle 174 of valve 26 to the neutral position the parts of the valves 26, 92, 148, and 48 will be in the position shown in Figure 1. As previously mentioned, during the shifting of piston 40 rightwardly, fluid flow ceased through restricted passageway 122 of valve 92, and spring 134 shifted spool 106 to the closed position, blocking communication between inlet port 90 and outlet port 94. Due to the fact that fluid will not now be discharging from the rod end of motor 38, spring 166 of valve 148 will shift spool 160 and open inlet port 146 to outlet port 150. Also, the stopping of motor 38 interrupts the flow of fluid through flow-regulating valve 48, and spring 82 will open compensating valve 54 to the fully open position.

If motor 38 is restarted after this interruption by shifting handle 174 of valve 26 to the right so as to connect conduit 18 to conduit 36 and conduit 52 to conduit 34, the speed of motor 38 will again be controlled in the same manner as if it was started in a rightward directional movement as previously described.

It should be noted that compensating valve 54 of flow-regulating valve 48 when in a normal regulating position is never fully open or fully closed. Whenever motor 38 is stopped, fluid flow through flow-regulating valve 48 is interrupted, and spring 82 opens compensating valve 54 to the fully open position. If rightward movement of the motor piston was started with the compensating valve in the fully open position, rather than in a normal regulating position, motor jump would result. Motor jump is a slight travel of the motor piston at a speed much greater than the normal regulated speed which is adapted to be maintained and controlled by the flow regulating valve. This is due to the fact that adjustable throttle 56 is originally set to pass a certain regulated amount of fluid. The regulation of this flow is controlled by compensating valve 54, and, if valve 54 is not in a regulating position when motor 38 is started but is fully open, an amount of fluid in excess of which throttle 56 is originally adjusted to pass will pass through the fully open compensating valve, causing the motor to jump slightly. Although the compensating valve 54 would almost immediately assume regulating position, the damage would already have been done.

It should also be noted that the incorporation of valve 92 and valve 148 in a hydraulic transmission containing a fluid motor and a flow-regulating valve for controlling the speed thereof is an efficient, simple and economical method of preventing motor jump when the motor is started in a regulated movement.

While the form of embodiment of the invention as herein disclosed constitutes a preferred form, it is to be understood that other forms might be adopted, all coming within the scope of the claims which follow.

What is claimed is as follows:

1. In a hydraulic power transmission system, the combination of a fluid pump, a reciprocable fluid motor, a directional control valve for selectively directing fluid to the motor in one direction or the other, a flow-regulating valve for controlling the speed of the motor and including in series in such valve an adjustable throttle through which fluid is adapted to flow at a regulated rate and a compensating valve of the type which is normally open when flow through the flow-regulating valve is interrupted and responsive to the pressure drop across the throttle for maintaining such pressure drop substantially constant, and a pilot circuit comprising a first means connected to a source of pressure fluid in the system and to the flow-regulating valve and a second means for controlling the operation of the first means and causing the first means to be operative to provide a source of low pressure fluid closing the compensating valve just before the motor is started in a regulated movement and causing the first means to be inoperative when flow to the flow-regulating valve resumes to permit the compensating valve to assume normal regulating position.

2. In a hydraulic power transmission system, the combination of a fluid pump, a reciprocable fluid motor, a directional control valve for selectively directing fluid to the motor in one direction or the other, a flow-regulating valve for controlling the speed of the motor and including in series in such valve an adjustable throttle through which fluid is adapted to flow at a regulated rate and a compensating valve of the type which is normally open when flow through the flow-regulating valve is interrupted and responsive to the pressure drop across the throttle for maintaining such pressure drop substantially constant, and a pilot circuit comprising a first means connected to a source of pressure fluid in the system and to the flow-regulating valve at a point between the compensating valve and throttle and a second pressure responsive means for controlling the operation of the first means and causing the first means to be operative to provide a source of low pressure fluid closing the compensating valve just before the motor is started in a regulated movement and causing the first means to be inoperative when flow to the flow-regulating valve resumes to permit the compensating valve to assume normal regulating position.

3. In a hydraulic power transmission system, the combination of a fluid pump, a reciprocable fluid motor, a directional control valve for selectively directing fluid to the motor in one direction or the other, a flow-regulating valve for controlling the speed of the motor and including in series in such valve an adjustable throttle through which fluid is adapted to flow at a regulated rate and a compensating valve of the type which is normally open when flow through the flow-regulating valve is interrupted and responsive to the pressure drop across the throttle for maintaining such pressure drop substantially constant, and a pilot circuit comprising a first means connected to a source of pressure fluid in the system and to the flow-regulating valve, said first means comprising a valve having an inlet, an outlet, a resiliently-loaded spool shiftable within a bore therein which is in communication with the inlet and the outlet, a pilot entrance chamber, a pilot exit chamber, a restricted passageway forming a means of communication between the pilot entrance chamber and the pilot exit chamber, and a vent passage in communication with the pilot exit chamber, said spool being shiftable to open the inlet to the outlet when fluid flow is initiated through the restricted passageway and to close the inlet to the outlet when fluid flow through the restricted passageway is interrupted, and a second means for controlling the operation of the first means and causing the first means to be operative to provide a source of low pressure fluid closing the compensating valve just before the motor is started in a regulated movement and causing the first means to be inoperative when flow to the flow-regulating valve resumes to permit the compensating valve to assume normal regulating position.

4. In a hydraulic power transmission system, the combination of a fluid pump, a reciprocable fluid motor, a directional control valve for selectively directing fluid to the motor in one direction or the other, a flow-regulating valve for controlling the speed of the motor and including in series in such valve an adjustable throttle through which fluid is adapted to flow at a regulated rate and a compensating valve of the type which is normally open when flow through the flow-regulating valve is interrupted and responsive to the pressure drop across the throttle for maintaining such pressure drop substantially constant, and a pilot circuit comprising a first means connected to a source of pressure fluid in the system and to the flow-regulating valve at a point between the compensating valve and throttle, said first means comprising a valve having an inlet, an outlet, a resiliently-loaded spool shiftable within a bore therein which is in communication with the inlet and the outlet, a pilot entrance chamber, a pilot exit chamber, a restricted passageway forming a means of communication between the pilot entrance chamber and the pilot exit chamber, and a vent passage in communication with the pilot exit chamber, said spool being shiftable to open the inlet to the outlet when fluid flow is initiated through the restricted passageway and to close the inlet to the outlet when fluid flow through the restricted passageway is interrupted, and a second pressure responsive means for controlling the operation of the first means and causing the first means to be operative to provide a source of low pressure fluid closing the compensating valve just before the motor is started in a regulated movement and causing the first means to be inoperative when flow to the flow-regulating valve resumes to permit the compensating valve to assume normal regulating position.

5. In a hydraulic power transmission system, the combination of a fluid pump, a reciprocable fluid motor, a directional control valve for selectively directing fluid to the motor in one direction or the other, a flow-regulating valve for controlling the speed of the motor and including in series in such valve an adjustable throttle through which fluid is adapted to flow at a regulated rate and a compensating valve of the type which is normally open when flow through the flow-regulating valve is interrupted and responsive to the pressure drop across the throttle for maintaining such pressure drop substantially constant, and a pilot circuit comprising a first means connected to a source of pressure fluid in the system and to the flow-regulating valve, said first means comprising a valve having an inlet, an outlet, a resiliently-loaded spool shiftable within a bore therein which is in communication with the inlet and the outlet, a pilot entrance chamber, a pilot exit chamber, a restricted passageway forming a means of communication between the pilot entrance chamber and the pilot exit chamber, and a vent passage in communication with the pilot exit chamber, said spool being shiftable to open the inlet to the outlet when fluid flow is initiated through the restricted passageway and to close the inlet to the outlet when fluid flow through the restricted passageway is interrupted, and a second means for controlling the initiation and interruption of fluid flow through the restricted passageway of the first means and causing the first means to be operative to provide a source of low pressure fluid closing the compensating valve just before the motor is started in a regulated movement and causing the first means to be inoperative when flow to the flow-regulating valve resumes to permit the compensating valve to assume normal regulation position.

6. In a hydraulic power transmission system, the combination of a fluid pump, a reciprocable fluid motor, a directional control valve for selectively directing fluid to the motor in one direction or the other, a flow-regulating valve for controlling the speed of the motor and including in series in such valve an adjustable throttle through which fluid is adapted to flow at a regulated rate and a compensating valve of the type which is normally open when flow through the flow-regulating valve is interrupted and responsive to the pressure drop across the throttle for maintaining such pressure drop substantially constant, and a pilot circuit comprising a first means having an inlet connected to a source of pressure fluid in the system, an outlet connected to the flow-regulating valve at a point between the compensating valve and throttle, a resiliently-loaded spool shiftable within a bore therein which is in communication with the inlet and the outlet, a pilot entrance chamber, a pilot exit chamber, a restricted passageway forming a means of communication between the pilot entrance chamber and the pilot exit chamber, and a vent passage in communication with the pilot exit chamber, said spool being shiftable to open the inlet to the outlet when fluid flow is initiated through the restricted passageway and to close the inlet to the outlet when fluid flow through the restricted passageway is interrupted, and a second means for controlling the initiation and interruption of fluid flow through the restricted passage of the first means and causing the first means to be operative to provide a source of low pressure fluid closing the compensating valve just before the motor is started in a regulated movement and causing the first means to be inoperative when flow to the flow-regulating valve resumes to permit the compensating valve to assume normal regulating position.

7. In a hydraulic power transmission system, the combination of a fluid pump, a reciprocable fluid motor, a directional control valve for selectively directing fluid to the motor in one direction or the other, a flow-regulating valve for controlling the speed of the motor and including in series in such valve an adjustable throttle through which fluid is adapted to flow at a regulated rate and a compensating valve of the type which is normally open when flow through the flow-regulating valve is interrupted and responsive to the pressure drop across the throttle for maintaining such pressure drop substantially constant, and a pilot circuit comprising a first means having an inlet connected to a source of pressure fluid in the system, an outlet connected to the flow-regulating valve at a point between the compensating valve and throttle, a resiliently-loaded spool shiftable within a bore therein which is in communication with the inlet and the outlet, a pilot entrance chamber, a pilot exit chamber, a restricted passageway forming a means of communication between the pilot entrance chamber and the pilot exit chamber, and a vent passage in communication with the pilot exit chamber, said spool being shiftable to open the inlet to the outlet when fluid flow is initiated through the restricted passageway and to close the inlet to the outlet when fluid flow through the restricted passageway is interrupted, and a second means for controlling the initiation and interruption of fluid flow through the restricted passage of the first means for initiating fluid flow through the restricted passage of the first means just before the motor is started in a regulated movement whereby the inlet is opened to the outlet and the first means is operative to provide a source of low pressure fluid closing the compensating valve and responsive to fluid pressure increases for interrupting fluid flow through the restricted passageway of the first means when the motor is started in a regulated movement whereby the inlet is closed to the outlet and the first means is made inoperative permitting the compensating valve to assume normal regulating position.

8. In a hydraulic power transmission system, the combination of a fluid pump, a reciprocable fluid motor, a directional control valve for selectively directing fluid to the motor in one direction or the other, a flow-regulating valve for controlling the speed of the motor comprising in series in said valve an adjustable throttle and a compensating valve of the type which is normally open when flow through the flow-regulating valve is interrupted, a first means for providing a source of low pressure fluid for closing the compensating valve before the motor is started in a regulated movement, said first means comprising a valve having an inlet connected to a source of pressure fluid in the system, an outlet connected to the flow-regulating valve at a point between the compensating valve and throttle, a resiliently-loaded spool shiftable within a bore therein which is in communication with the inlet and the outlet, a pilot entrance chamber, a pilot exit chamber, a restricted passageway forming a means of communication between the pilot entrance chamber and the pilot exit chamber, and a vent passage in communication with the pilot exit chamber, said spool being shiftable to open the inlet to the outlet when fluid flow is initiated through the restricted passageway and to close the inlet to the outlet when fluid flow through the restricted passageway is interrupted, and a second means for initiating and interrupting a flow of fluid through the restricted passageway of the first means, said second means being responsive to fluid pressure decreases before the motor is started in a regulated movement for initiating a flow of fluid through the restricted passageway of the first means and being responsive to fluid pressure increases when the motor is started in a regulated movement for interrupting the flow of fluid through the restricted passageway of the first means whereby the compensating valve is in normal regulating position when the motor is started in a regulated movement and motor jump is prevented.

ALBERT M. LANE.

REFERENCES CITED

The following references are of record in the file of this patent:

UNITED STATES PATENTS

| Number | Name | Date |
|---|---|---|
| 1,985,443 | Clute | Dec. 25, 1934 |
| 2,328,979 | Herman | Sept. 7, 1943 |